(12) United States Patent
Chen et al.

(10) Patent No.: US 11,325,137 B2
(45) Date of Patent: May 10, 2022

(54) MULTI-CONICAL CYCLONE SEPARATOR AND DUST COLLECTING APPARATUS INCLUDING THE SAME

(71) Applicant: Airplove (Xiamen) Electronic Co., Ltd., Fujian (CN)

(72) Inventors: Jueyuan Chen, Fujian (CN); Jiefeng Liu, Fujian (CN)

(73) Assignee: AIRPLOVE (XIAMEN) ELECTRONIC CO., LTD., Fujian (CN)

(*) Notice: Subject to any disclaimer, the term of this patent is extended or adjusted under 35 U.S.C. 154(b) by 178 days.

(21) Appl. No.: 16/888,952

(22) Filed: Jun. 1, 2020

(65) Prior Publication Data

US 2021/0299681 A1    Sep. 30, 2021

(30) Foreign Application Priority Data

Mar. 27, 2020 (CN) .......................... 202010228767.5

(51) Int. Cl.

| | |
|---|---|
| *B01D 50/00* | (2022.01) |
| *B04C 5/28* | (2006.01) |
| *B04C 5/02* | (2006.01) |
| *B04C 5/185* | (2006.01) |
| *B04C 9/00* | (2006.01) |
| *B01D 45/12* | (2006.01) |

(52) U.S. Cl.
CPC ................ *B04C 5/28* (2013.01); *B01D 45/12* (2013.01); *B04C 5/02* (2013.01); *B04C 5/185* (2013.01); *B04C 9/00* (2013.01)

(58) Field of Classification Search
CPC .. B04C 5/28; B04C 5/02; B04C 5/185; B04C 9/00; B04C 2009/002; A47L 9/1608; A47L 9/1625; A47L 9/1641; A47L 9/165; A47L 9/1666; A47L 9/10; A47L 9/127; A47L 9/1691
See application file for complete search history.

(56) References Cited

U.S. PATENT DOCUMENTS

| | | | | |
|---|---|---|---|---|
| 2,281,610 | A | * | 5/1942 | Watson ..................... B04C 5/28 55/344 |
| 2,746,604 | A | * | 5/1956 | Fontein ..................... B03B 9/00 106/756 |
| 3,494,474 | A | * | 2/1970 | Estabrook ................. B04C 5/02 210/512.1 |
| 4,539,105 | A | * | 9/1985 | Metcalf .................... B04C 5/08 156/84 |

(Continued)

*Primary Examiner* — Dung H Bui
(74) *Attorney, Agent, or Firm* — Muncy, Geissler, Olds & Lowe, P.C.

(57) ABSTRACT

The invention discloses a conical cyclone separator and a dust collecting apparatus including the same. The multi-conical cyclone separator includes a multi-conical main body and a fitting multi-conical cover body, the multi-conical main body has conical tubes, the multi-conical cover body has diversion columns which correspond to the conical tubes one by one, the diversion column is inserted into the corresponding conical tube to form a casing structure, the side of each conical tube of the multi-conical main body is provided with an air inlet and a compensation tuyere for compensating an inlet air flow rate to reduce a negative pressure in the conical tube and improve a dust-gas separation effect.

10 Claims, 9 Drawing Sheets

(56) References Cited

U.S. PATENT DOCUMENTS

| | | | | |
|---|---|---|---|---|
| 4,721,565 | A * | 1/1988 | Carroll | B04C 5/081 |
| | | | | 210/251 |
| 4,969,934 | A * | 11/1990 | Kusik | B01D 46/26 |
| | | | | 95/270 |
| 4,980,064 | A * | 12/1990 | Carroll | B01D 17/0217 |
| | | | | 209/733 |
| 5,017,288 | A * | 5/1991 | Thew | B04C 5/081 |
| | | | | 209/727 |
| 5,108,608 | A * | 4/1992 | Carroll | B01D 17/0214 |
| | | | | 210/512.1 |
| 8,679,211 | B1 * | 3/2014 | Makarov | A47L 9/1641 |
| | | | | 55/343 |
| 10,717,026 | B1 * | 7/2020 | Anderson | B04C 3/04 |
| 10,722,832 | B1 * | 7/2020 | Spencer | B01D 45/16 |
| 2005/0077234 | A1 * | 4/2005 | Yoshida | B04C 5/04 |
| | | | | 210/512.1 |
| 2007/0214754 | A1 * | 9/2007 | Kim | A47L 9/1608 |
| | | | | 55/345 |
| 2007/0214756 | A1 * | 9/2007 | Lee | B04C 5/04 |
| | | | | 55/419 |
| 2008/0209669 | A1 * | 9/2008 | Kah | A47L 9/1641 |
| | | | | 15/350 |
| 2013/0118960 | A1 * | 5/2013 | Tandon | B04C 5/28 |
| | | | | 210/95 |
| 2016/0008741 | A1 * | 1/2016 | Beg | B04C 5/081 |
| | | | | 96/182 |
| 2016/0288019 | A1 * | 10/2016 | Ernst | B01D 19/0057 |
| 2017/0296017 | A1 * | 10/2017 | Hyun | B04C 7/00 |
| 2018/0085761 | A1 * | 3/2018 | Dressier | C10B 27/00 |
| 2020/0008636 | A1 * | 1/2020 | Lee | A47L 9/1641 |
| 2021/0085147 | A1 * | 3/2021 | Yu | A47L 9/1625 |
| 2021/0212539 | A1 * | 7/2021 | Lee | A47L 9/1683 |

* cited by examiner

MULTI-CONICAL CYCLONE SEPARATOR AND DUST COLLECTING APPARATUS INCLUDING THE SAME

TECHNICAL FIELD

The present invention discloses a conical cyclone separator and a dust collecting apparatus including the same, and belongs to the technical field of dust collecting devices according to the International Patent Classification (IPC).

BACKGROUND

With the rapid development of small household appliances technology and the continuous improvement of people's living standards, a dust collector has become one of the necessary appliances in people's daily lives. After the dust collector is powered on, the wind machine will produce higher suction and pressure at a high rotating speed. Under the action of suction and pressure, the air is discharged at a high speed, resulting in the generation of a negative pressure difference between the inside of the dust collector and the outside atmospheric pressure. Under the action of this pressure difference, dust and dirt are sucked in together with the air, impurities such as dust and dirt are retained in a dust collecting container, and the air is discharged after being purified. However, the dust collectors on the market often have the problem of poor filtering effect.

The cyclonic dust collectors on the market achieve sorting of gas and dust impurities by cyclone separation. A multi-conical cyclone separation system is a more advanced structure form with a better separation effect. In the multi-conical cyclone separation system, the preliminary filtering is to separate impurities such as large particles of dust in the air, and after entering the multi-conical structure, impurities such as smaller particles of dust in the air are to be separated, which makes separation more difficult. However, in each cone of the existing multi-conical structure, the negative pressure is large, the flow rate is small, and the effect of separating dust impurities is poor. Due to the large negative pressure, the noise generated by the machine is large.

An existing multi-conical cyclone structure includes multi-conical upper cover, middle cover and lower cover, and a spiral fan blade structure is provided on the middle cover. The airflow is rotated by the fan blade. Since the fan blade structure changes the vortex flow generated by a vortex structure driven by a motor, the separation effect of gas and dust is reduced. In addition, there are many parts in this assembly, the mold building, production and assembly need to be individually performed on the multi-conical upper cover, middle cover and lower cover, and the costs such as injection cost/assembly cost/material cost/mold cost and the like, are relatively high.

After long-term research and practice combined with the principles of dust collector fluid mechanics, the inventor of the present invention develops a multi-conical cyclone separation apparatus to improve the filtering effect, and proposes the present invention.

SUMMARY

In view of the shortcomings of the prior art, the present invention provides a multi-conical cyclone separator with optimized structure, convenient assembly and improved filtering effect.

To achieve the above object, the present invention is achieved by the following technical solutions:

A multi-conical cyclone separator includes a multi-conical main body and a fitting multi-conical cover body, the multi-conical main body has four or more conical tubes each of which is distributed along a circumferential array, the multi-conical cover body has diversion columns which correspond to the conical tubes one by one, when the multi-conical cover body and the multi-conical main body fit by sealing, the diversion column is inserted into the corresponding conical tube to form a casing structure, the side of each conical tube of the multi-conical main body is provided with an air inlet, a high-speed vortex flow is formed in each conical tube to separate air with dust impurities attached, and the separated airflow is discharged upward by the diversion column.

Furthermore, the side of each conical tube of the multi-conical main body is provided with a compensation tuyere for compensating an inlet air flow rate to reduce a negative pressure in the conical tube and improve a dust-gas separation effect.

Furthermore, the compensation tuyere of the conical tube is smaller than the air inlet, a guide angle is provided at the air inlet, and the guide angle extends away from a center of the multi-conical main body to form an enlarged inlet air collecting structure.

Furthermore, the air inlet or the compensation tuyere of the conical tube is higher than a bottom port of the inserted diversion column, so that wind flows toward a bottom of a conical tube head to form a vortex flow.

Furthermore, two or more connecting columns are provided on the multi-conical cover body, the connecting columns are located in an annular ring where the diversion column is located, and each connecting column passes through a through hole fitting on the multi-conical main body and is fixed, so that the multi-conical main body and the multi-conical cover body are connected by sealing a joint surface therebetween.

The present invention provides a dust collecting apparatus comprising: a dust collecting cylinder, a primary filtering structure and a multi-conical cyclone separator, wherein the primary filtering structure is provided in the dust collecting cylinder and includes a filter screen, the side of the dust collecting cylinder is provided with an air inlet, a diversion dome is provided at the air inlet, an airflow spiral cavity is formed between the dust collecting cylinder and the primary filtering structure, the multi-conical cyclone separator is provided in the filter screen, and the primary filtering structure and the multi-conical cyclone separator are disposed at a center of the dust collecting cylinder.

Furthermore, the primary filtering structure includes a support frame, the filter screen is ring-shaped, a bottom end of the filter screen is fixed on the support frame, a top end of the filter screen and a ring portion of the diversion dome fit by connecting, the filter screen, the support frame and the diversion dome form a space for mounting the multi-conical cyclone separator, and the multi-conical cover body is rotatably fastened with the dust collecting cylinder.

Furthermore, the diversion dome includes a diversion portion and a ring portion, the diversion portion and the air inlet fit, the diversion portion has a horizontal partition surface and an arc-shaped diversion surface, and the ring portion of the diversion dome is connected to a fitting interface of the multi-conical cover body by sealing.

Furthermore, the support frame includes a support plate and a support base below, the support plate is provided with a convex column for connecting the connecting column extending downward from the multi-conical cover body, the support plate is provided with interfaces each of which matches each conical tube of the multi-conical main body, the support base has a hollow structure, and a bottom end of the support base is fixed at a protrusion at a center of the dust collecting cylinder.

Furthermore, the dust collecting apparatus further includes:

a primary filtering flow path which is used to filter larger dust impurities, formed in a space between the dust collecting cylinder and the primary filtering structure, and connected to the air inlet, a first collecting portion, and several meshes of the filter screen;

a secondary filtering flow path which is used to filter smaller dust impurities, composed of a plurality of cyclone flow paths arranged in parallel, formed in a space inside the multi-conical cyclone separator, each cyclone flow path being connected to the air inlet of the conical tube, a space inside the conical tube, a second collecting portion, and an air outlet of the multi-conical cover body;

a connecting flow path which connects the meshes of the filter screen of the primary filtering structure and each air inlet of the multi-conical cyclone separator, so that airflow filtered by the primary filtering structure is distributed to the multi-conical cyclone separator.

The present invention has the following beneficial effects:

1. The multi-conical cyclone separator of the present invention is mainly composed of a multi-conical main body and a multi-conical cover body, that is, a multi-conical upper/lower cover. Compared with the existing multi-conical structure on the market, the middle cover structure is reduced, the assembly is much simpler, and from the viewpoint of cost, the cost is relatively low (reducing injection cost/assembly cost/material cost/mold cost, and the like). This structure integrates the diversion column and the multi-conical cover body, which optimizes the structure. From the viewpoint of fluid mechanics, without the fan blade structure of the middle cover, the vortex generated by the motor is not blocked, and the dust impurities will be separated more effectively.

2. The side of the conical tube of the present invention is provided with a compensation tuyere for compensating the inlet air flow rate of the conical tube. It can be known from the fluid mechanics that after the flow rate increases, the negative pressure in the conical tube decreases, thereby improving the dust-gas separation effect.

3. In the dust collecting apparatus of the present invention, after garbage impurities, or dust and dust particles enter the body of the dust collecting cylinder through the air inlet, the garbage and dust enter the first stage of rotary filtering, and some garbage and dust with relatively large mass and volume are filtered by a metal filter screen. After the first stage of rotary filtering, the garbage and dust particles enter the multi-conical cyclone separator, and the fine garbage impurities and dust form a high-speed vortex flow under the suction action of the vacuum motor. This vortex flow will further classify relatively large or heavy garbage and dust. That is, larger/heavier dust is collected to the bottom of the conical tube head, and the fine dust enters the next stage of filtering, so as to achieve the best secondary filtering effect and enter the next stage of refined filtering process.

DETAILED DESCRIPTION OF THE EMBODIMENTS

Figure 1:
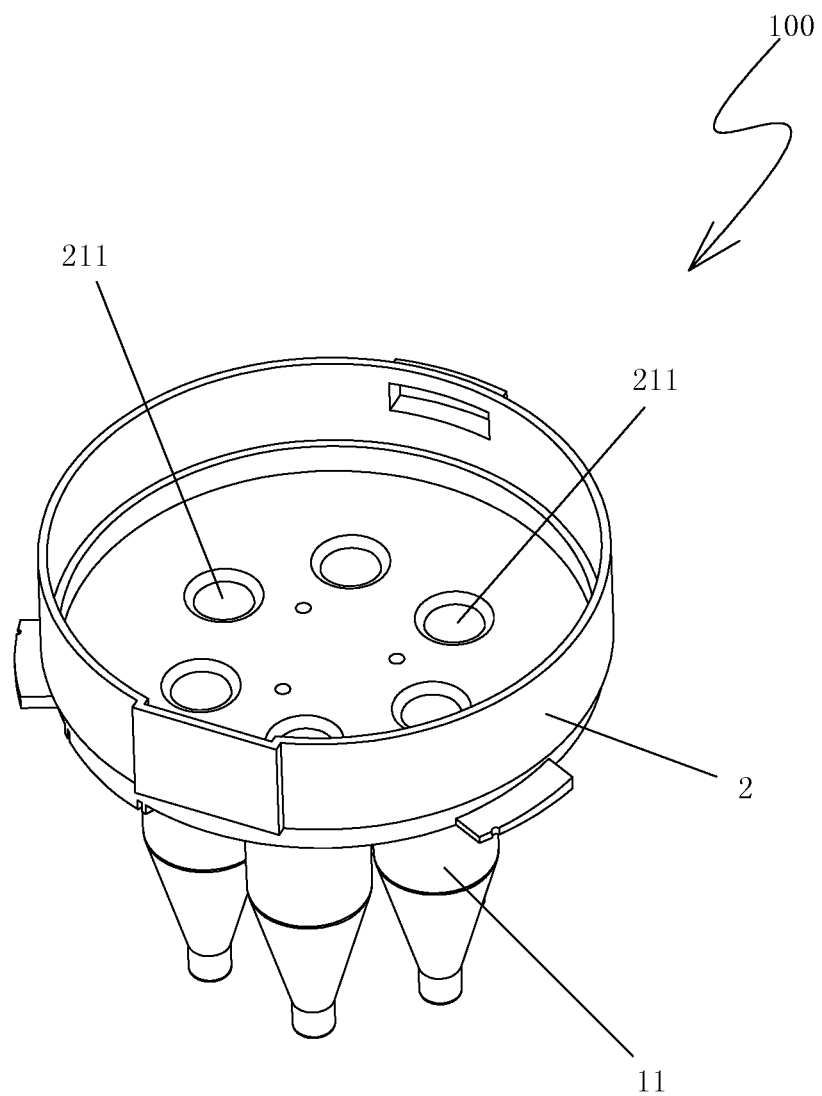
FIG. 1 is a schematic view of an embodiment of the multi-conical cyclone separator of the present invention.

The present invention will be further described below with reference to the drawings:

Embodiment: please refer to FIGS. 1 to 8, a multi-conical cyclone separator 100 includes a multi-conical main body 1 and a fitting multi-conical cover body 2. The multi-conical main body 1 has four or more conical tubes 11, each of which is distributed along a circumferential array. The multi-conical cover body 2 has diversion columns 21 which correspond to the conical tubes 11 one by one. When the multi-conical cover body 2 and the multi-conical main body 1 fit by sealing, the diversion column 21 is inserted into the corresponding conical tube 11 to form a casing structure. The side of each conical tube of the multi-conical main body 1 is provided with an air inlet 111. A high-speed vortex flow is formed in each conical tube to separate air with dust impurities attached. The separated airflow is discharged upward by the diversion column 21. The side of each conical tube 11 of the multi-conical main body 1 is provided with a compensation tuyere 112 for compensating an inlet air flow rate to reduce a negative pressure in the conical tube, thereby improving a dust-gas separation effect. The multi-conical main body 1 and the multi-conical cover body 2 are generally ring-shaped. The number of the conical tubes 11 of the multi-conical main body 1 can be set to 4, 5, 6, 7, 8 and the like according to actual requirement. A top port of the corresponding diversion column is disposed on an upper surface of the multi-conical cover body to form an air outlet 211, which forms a corresponding number of cyclone flows or vortex flows under the action of suction and negative pressure.

Figure 2:
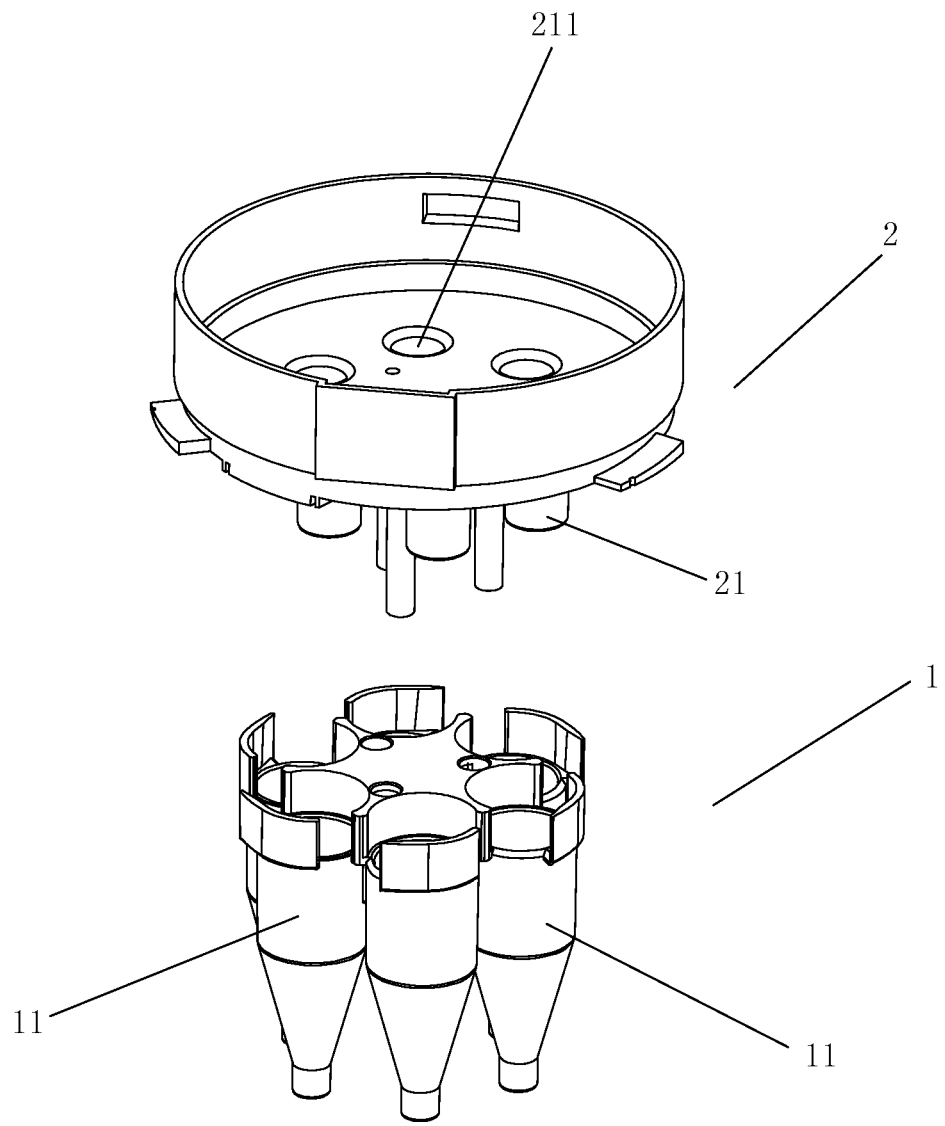
FIG. 2 is an exploded view of an embodiment of the multi-conical cyclone separator of the present invention.
Figure 3:
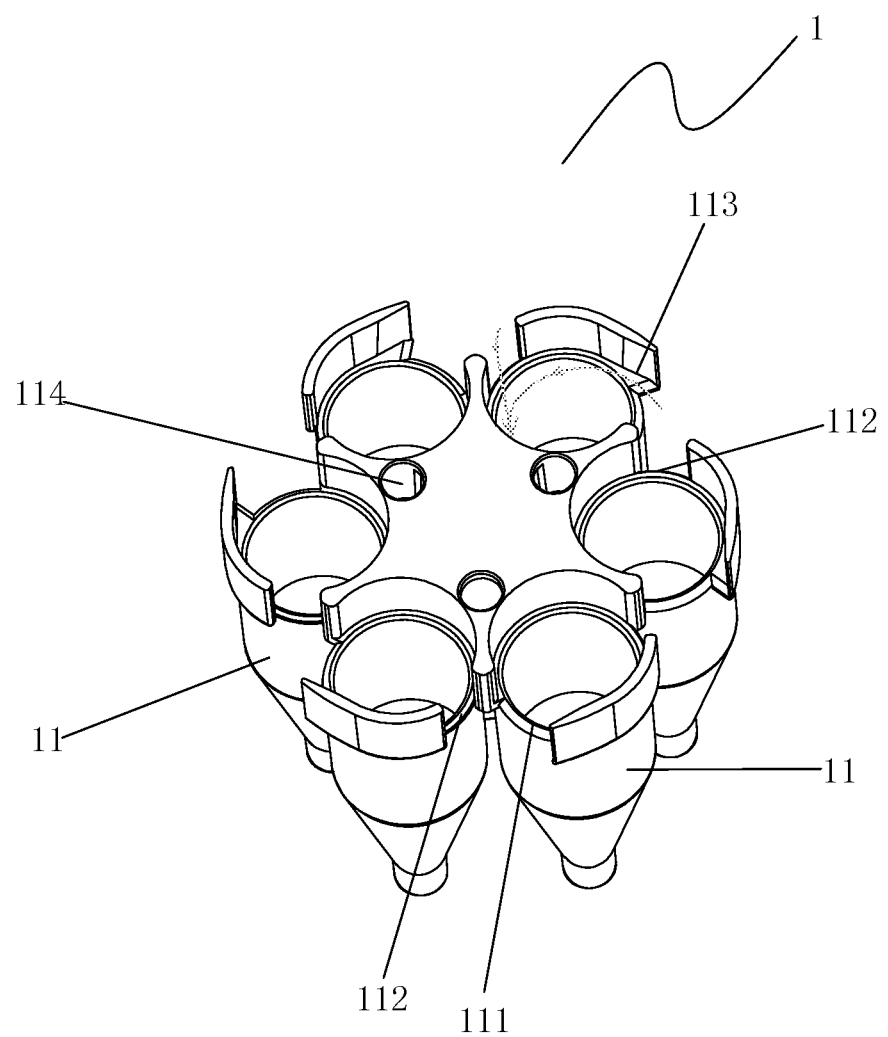
FIG. 3 is a schematic view of the multi-conical main body of the present invention.
Figure 6:
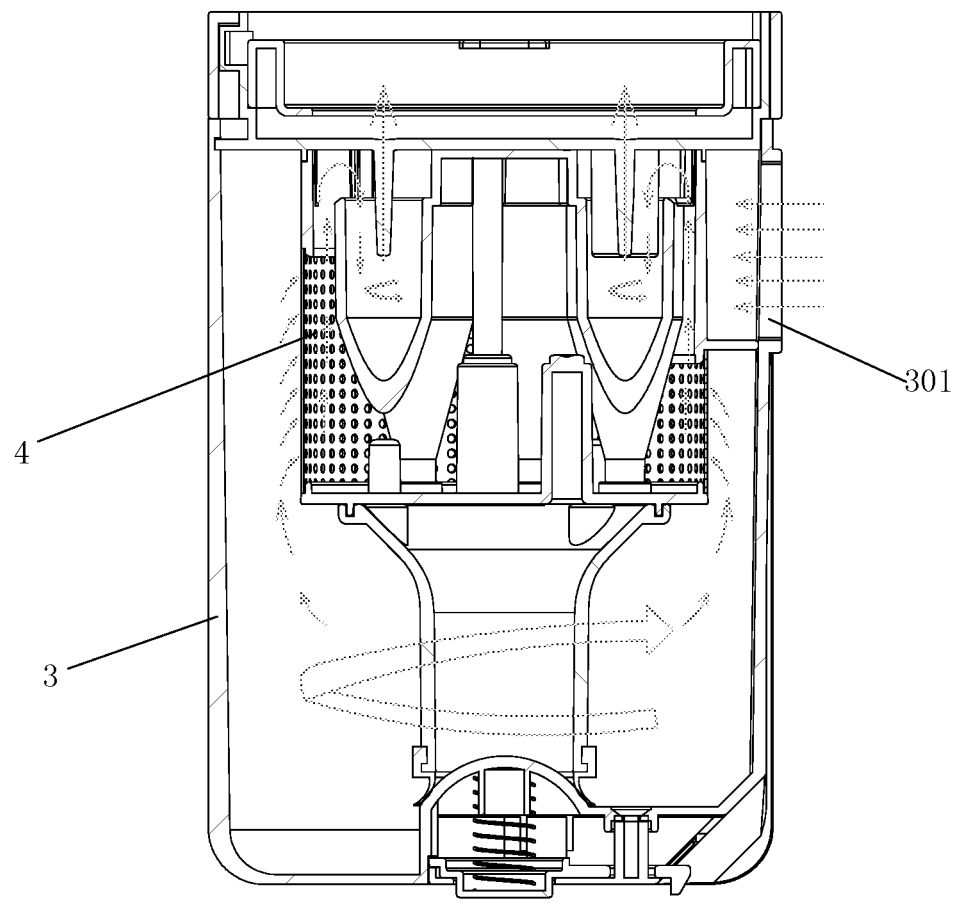
FIG. 6 is a schematic view of the airflow of the dust collecting apparatus of the present invention.
Figure 8:
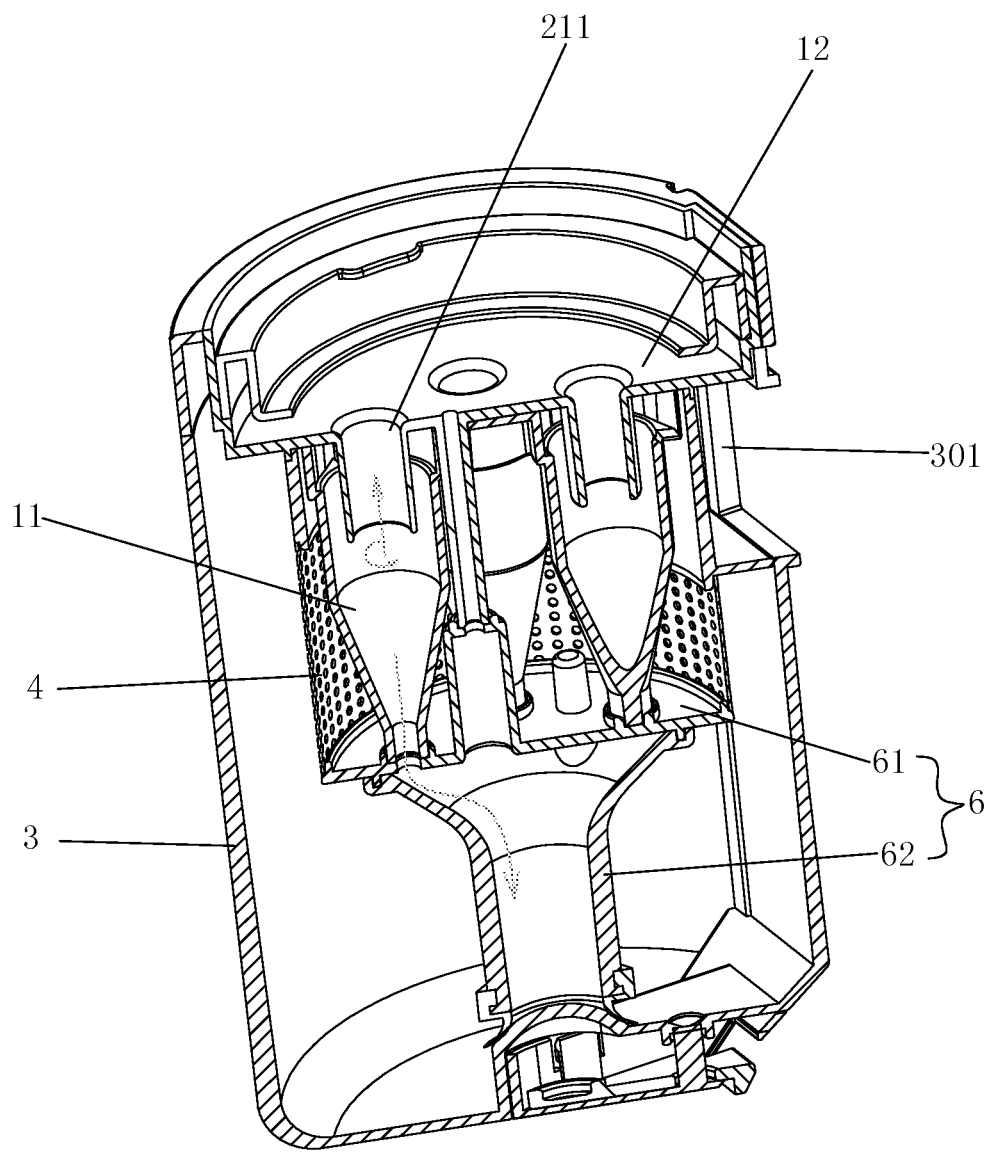
FIG. 8 is a schematic sectional stereogram of the dust collecting apparatus of the present invention.

Please refer to FIGS. 2 and 3, the compensation tuyere 112 of the conical tube 11 is smaller than the air inlet 111, a guide angle 113 is provided at the air inlet, and the guide angle 113 extends away from the center of the multi-conical main body to form an enlarged inlet air collecting structure. The air inlet 111 of one conical tube 11 is disposed adjacent to the compensation tuyere 112 of an adjacent conical tube. The air inlet 111 faces a spiral direction of airflow to be entered. The air inlet 111 and the compensation tuyere 112 are disposed at the top of the side of the conical tube 11, so that the entered airflow makes full use of the space in the conical tube to improve the separation effect. As shown in FIGS. 6 and 8, the air inlet 111 or the compensation tuyere 112 of the conical tube 11 is higher than a bottom port of the inserted diversion column 21, so that wind flows toward the bottom of a conical tube head to form a vortex flow.

In the present invention, the conical tube 11 is provided with the compensation tuyere 112, which is used to compensate the inlet air flow rate of the conical tube, reduce the negative pressure in the conical tube, and further improve the dust-gas separation effect. At the same time, in order to avoid a wind direction collision or a flocculation flow phenomenon in the conical tube, the following two measures are employed:

1. The air inlet 111 is larger than the compensation tuyere 112, and the flow rate of the air inlet is set to about twice the flow rate of the compensation tuyere. After entering the air inlet 111, the airflow forms a main cyclone trend, and the small airflow entering from the compensation tuyere 112 joins the above trend to form a vortex flow with a greater wind volume.

2. The air inlet 111 faces a spiral direction of airflow to be entered. The airflow entering from the air inlet 111 first forms a cyclone trend, and then the airflow entering from the compensation tuyere 112 consciously joins the above trend to form a vortex flow with a greater wind volume.

Figure 4:
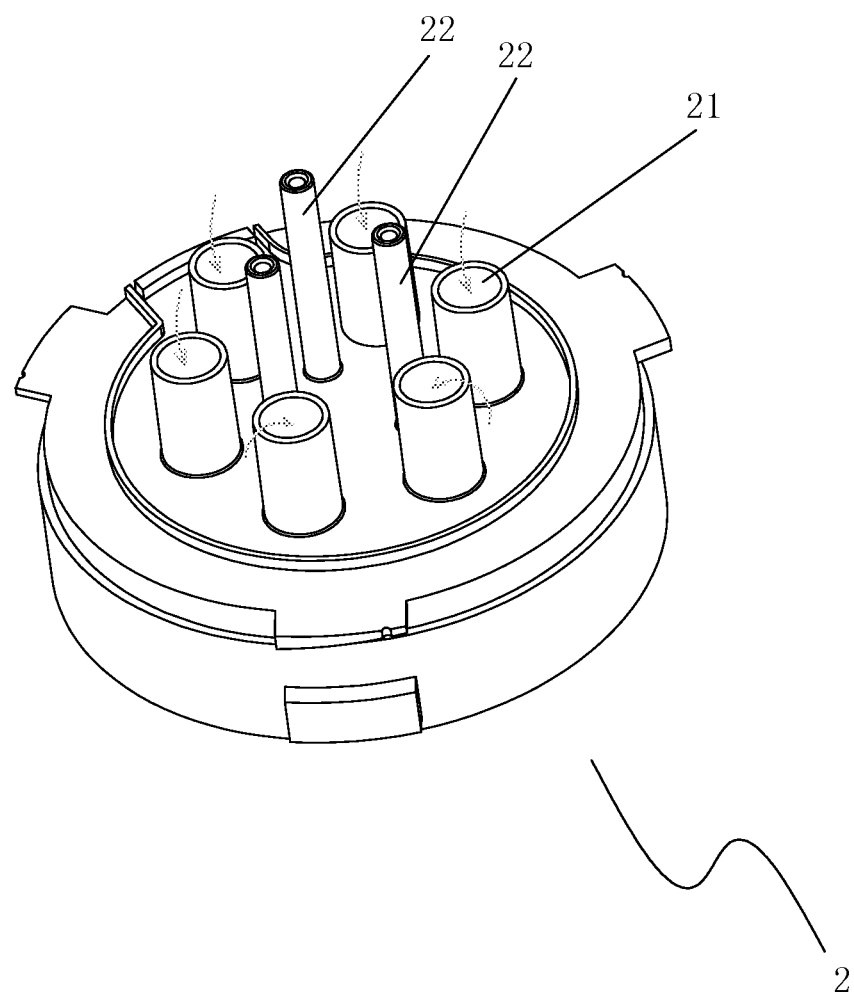
FIG. 4 is a schematic view of the multi-conical cover body of the present invention.
Figure 5:
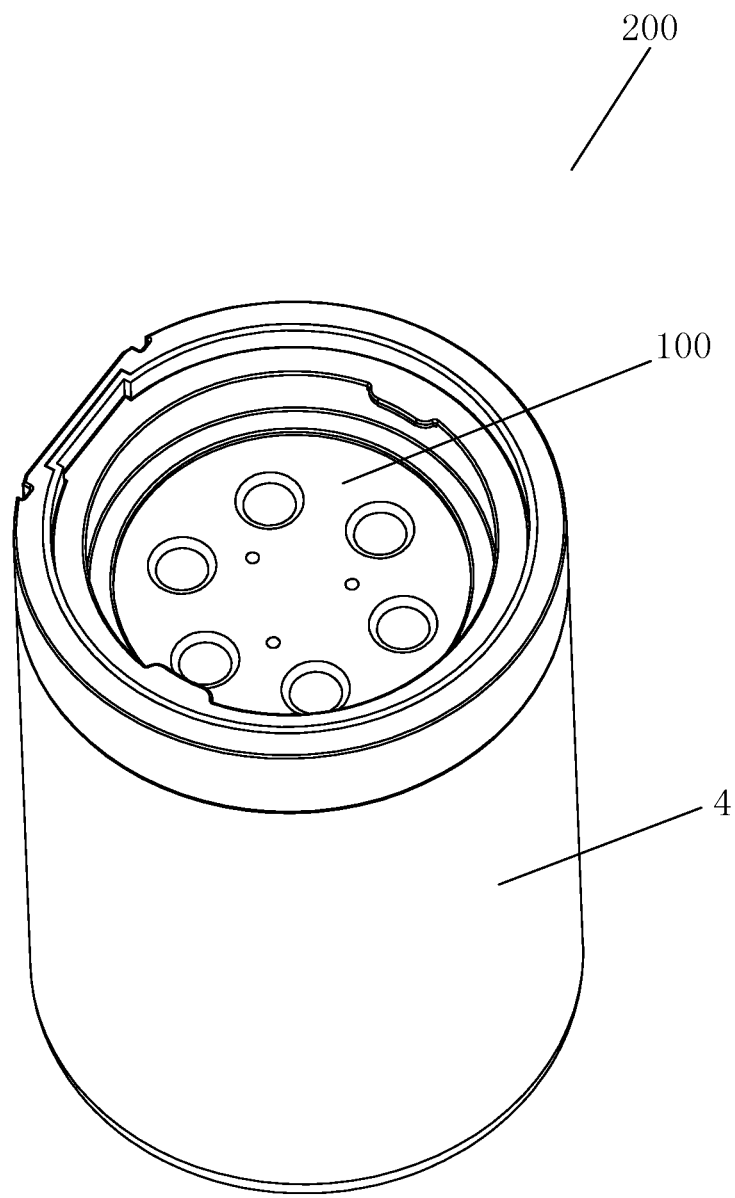
FIG. 5 is a schematic view of an embodiment of the dust collecting apparatus of the present invention.

Please refer to FIGS. 3, 4 and 8. Two or more connecting columns 22 are provided on the multi-conical cover body 2. The connecting columns 22 are located in an annular ring where the diversion column 21 is located. Each connecting column 22 passes through a through hole 114 fitting on the multi-conical main body 1 and is fixed, so that the multi-conical main body 1 and the multi-conical cover body 2 are connected by sealing a joint surface therebetween. In this embodiment, three connecting columns are disposed, and each connecting column is distributed circumferentially.

Figure 9:
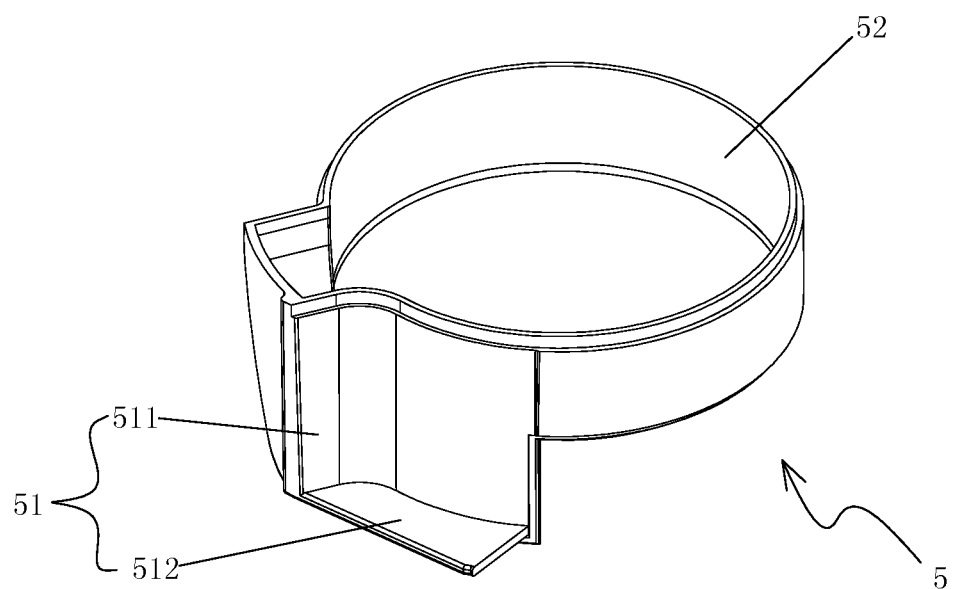
FIG. 9 is a schematic view of a diversion dome of an embodiment of the present invention.

Please refer to FIGS. 1 to 8, the present invention provides a dust collecting apparatus 200, which includes a dust collecting cylinder 3, a primary filtering structure and the multi-conical cyclone separator 100. The primary filtering structure is provided in the dust collecting cylinder 3 and includes a filter screen 4. The side of the dust collecting cylinder 3 is provided with an air inlet 301, and a diversion dome 5 is provided at the air inlet. An airflow spiral cavity is formed between the dust collecting cylinder 3 and the primary filtering structure. The multi-conical cyclone separator 100 is provided in the filter screen 4. The primary filtering structure and the multi-conical cyclone separator are disposed at the center of the dust collecting cylinder 3. The primary filtering structure includes a support frame 6. The filter screen 4 is ring-shaped, the bottom end of the filter screen 4 is fixed on the support frame 6, and the top end of the filter screen 4 and a ring portion of the diversion dome 5 fit by connecting. The filter screen 4, the support frame 6 and the diversion dome 5 form a space for mounting the multi-conical cyclone separator 100. The multi-conical cover body 2 is rotatably fastened with the dust collecting cylinder 3. As shown in FIG. 9, the diversion dome 5 includes a diversion portion 51 and a ring portion 52. The diversion portion 51 and the air inlet 301 fit. The diversion portion 51 has a horizontal partition surface 512 and an arc-shaped diversion surface 511. The ring portion 52 of the diversion dome is connected to a fitting interface of the multi-conical cover body 2 by sealing. The support frame 6 includes a support plate 61 and a support base 62 below. The support plate 61 is provided with a convex column for connecting the connecting column 22 extending downward from the multi-conical cover body 12, and the support plate 61 is provided with interfaces each of which matches each conical tube of the multi-conical main body. The support base 62 has a hollow structure. The conical tube and the interface of the support plate are connected to a space inside the support base. The bottom end of the support base 62 is fixed at a protrusion at the center of the dust collecting cylinder 3.

The dust collecting cylinder 3 of the present invention is located at the bottom of the periphery of the support frame as a first collecting portion for collecting larger dust impurities separated by the primary filtering structure. The support base 62 of the support frame 6 supports the multi-conical cyclone separator 100, and the space inside the support base also serves as a second collecting portion for collecting smaller dust impurities separated by the multi-conical cyclone separator. In the present invention, the first and second collecting portions are located at the lower part of the dust collecting apparatus. When the dust collecting cylinder is divided and opened, the second collecting portion is opened synchronously, which is convenient to discharge the collected large and small dust impurities.

Figure 7:
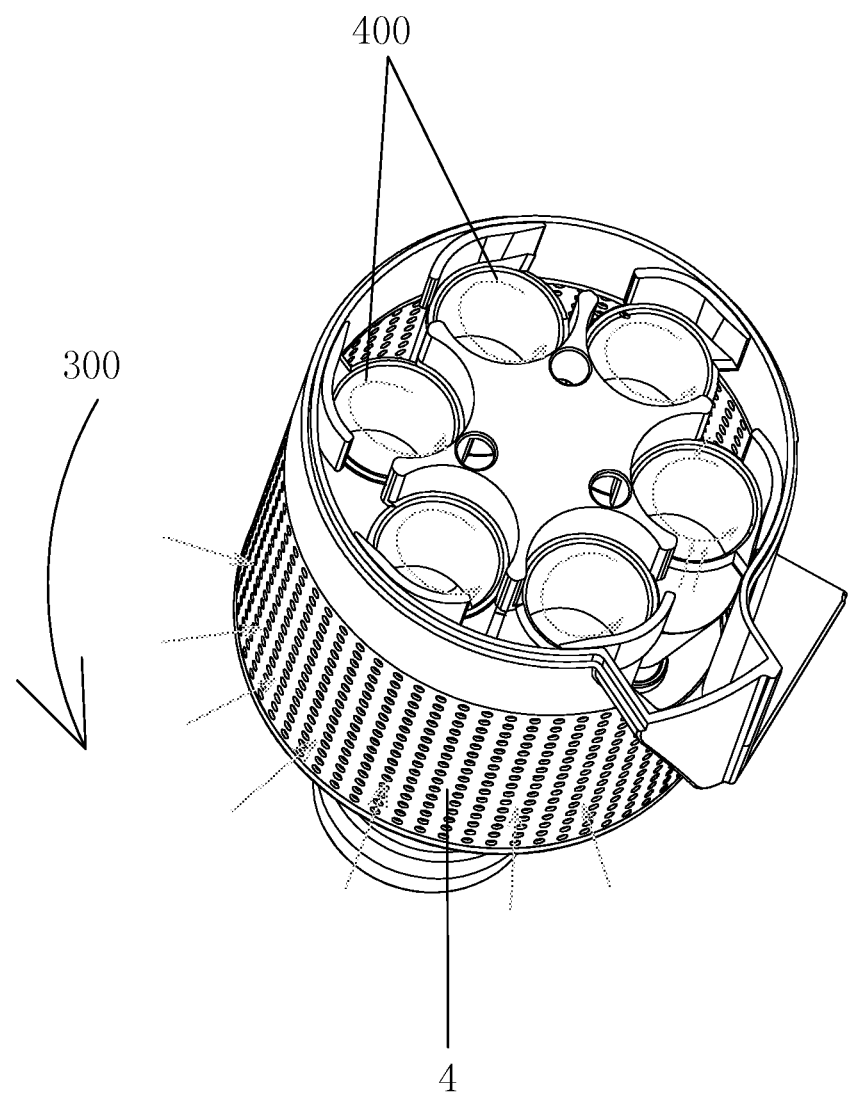
FIG. 7 is a schematic view of the internal flow of the dust collecting apparatus of the present invention.

Please refer to FIGS. 6, 7 and 8, the dust collecting apparatus of the present invention further includes:

a primary filtering flow path 300 which is used to filter larger dust impurities, formed in a space between the dust collecting cylinder and the primary filtering structure, and connected to the air inlet 301, the first collecting portion, and several meshes of the filter screen 4;

a secondary filtering flow path 400 which is used to filter smaller dust impurities, composed of a plurality of cyclone flow paths arranged in parallel, formed in a space inside the multi-conical cyclone separator 100 and the support base 62, each cyclone flow path being connected to the air inlet 111 of the conical tube, a space inside the conical tube 11, the second collecting portion, and the air outlet 211 of the multi-conical cover body, in this embodiment, there are 6 cyclone vortex flows;

a connecting flow path which connects the meshes of the filter screen 4 of the primary filtering structure and each air inlet 111 of the multi-conical cyclone separator, so that airflow filtered by the primary filtering structure is distributed to the multi-conical cyclone separator.

The present invention is mainly directed to the improvement of the air duct structure/function of a dust collecting apparatus of a dust collector, and mainly includes the dust collecting cylinder 3, the multi-conical cyclone separator 100, the support plate 61 (that is, a separator bracket), a stainless steel filter screen, the diversion dome 5 (including an air inlet guide), the support base 62 (multi-conical cyclone system bracket), an one-button dust collecting loosening/locking structure, and the like. After garbage or dust particles enter the body of the dust collecting cylinder through the air inlet, the garbage or dust particles enters the first stage of rotary filtering. The first stage of rotary filtering is mainly to collect garbage and dust particles with relatively larger volume/weight. The dust particles will sink to the bottom of the dust collecting cylinder 3 under the action of gravity. After passing through the metal filter screen, the garbage and dust will enter the core filtering system of this solution, that is, the multi-conical cyclone separator (multi-conical cyclone air duct system). This system is mainly composed of six conical hollow cylinders in a circumferential array, thereby forming six high-speed vortex flows in a circumferential array. The vortex flows will further classify relatively large or heavy garbage and dust, so as to achieve the best secondary filtering effect and enter the next stage of refined filtering.

A spinning up vortex (similar to a small-scale tornado) will be generated in the dust collector. Dust and various impurities rotate in the vortex. Due to different qualities of various dust and impurities, large particles have a large centrifugal force, and will be thrown out the center of the cyclone and fall to the bottom of the dust collecting cylinder. The small particles will continue to rise, enter a circle of smaller conical tubes of the multi-conical cyclone separator through the filter screen, and become a vortex with a smaller diameter. Under the centrifugal action, the separated particles fall to the bottom of the conical tube head. Some ultra-fine particles remaining in the airflow will be filtered and cleaned by refined filters, such as a HEPA filter element mounted in the groove where each air outlet of the multi-conical cover body is located.

The above records are only embodiments using the technical content of the present invention. Any modification or change made by those skilled in the art using the present invention is within the claimed scope of the present invention, and the present invention is not limited to the disclosure in the embodiments.

What is claimed is:

1. A multi-conical cyclone separator comprising: a multi-conical main body and a fitting multi-conical cover body, wherein the multi-conical main body has four or more conical tubes each of which is distributed along a circumferential array, the multi-conical cover body has diversion columns which correspond to the conical tubes one by one, when the multi-conical cover body and the multi-conical main body fit by sealing, the diversion column is inserted into the corresponding conical tube to form a casing structure, the side of each conical tube of the multi-conical main body is provided with an air inlet, a high-speed vortex flow is formed in each conical tube to separate air with dust impurities attached, and the separated airflow is discharged upward by the diversion column, the side of each conical tube of the multi-conical main body is provided with a compensation tuyere for compensating an inlet air flow rate to reduce a negative pressure in the conical tube and improve a dust-gas separation effect, the compensation tuyere of the conical tube is smaller than the air inlet, a guide angle is provided at the air inlet, and the guide angle extends away from a center of the multi-conical main body to form an enlarged inlet air collecting structure, both the air inlet and the tuyere are at a top side of the conical tube, and the air flow rate of the inlet is greater than the air flow rate of the tuyere.

2. The multi-conical cyclone separator according to claim 1, wherein the air inlet of the conical tube faces a spiral direction of airflow to be entered.

3. The multi-conical cyclone separator according to claim 1, wherein the air inlet of the conical tube faces a spiral direction of airflow to be entered, and the air inlet or the compensation tuyere of the conical tube is higher than a bottom port of the inserted diversion column, so that wind flows toward a bottom of a conical tube head to form a vortex flow.

4. The multi-conical cyclone separator according to claim 1, wherein two or more connecting columns are provided on the multi-conical cover body, the connecting columns are located in an annular ring where the diversion column is located, and each connecting column passes through a through hole fitting on the multi-conical main body and is fixed, so that the multi-conical main body and the multi-conical cover body are connected by sealing a joint surface therebetween.

5. A dust collecting apparatus comprising: a dust collecting cylinder, a primary filtering structure and a multi-conical cyclone separator, wherein the primary filtering structure is provided in the dust collecting cylinder and includes a filter screen, a side of the dust collecting cylinder is provided with an air inlet, a diversion dome is provided at the air inlet, an airflow spiral cavity is formed between the dust collecting cylinder and the primary filtering structure, the multi-conical cyclone separator is provided in the filter screen, the primary filtering structure and the multi-conical cyclone separator are disposed at a center of the dust collecting cylinder, the multi-conical cyclone separator includes a multi-conical main body and a fitting multi-conical cover body, the multi-conical main body has four or more conical tubes each of which is distributed along a circumferential array, the multi-conical cover body has diversion columns which correspond to the conical tubes one by one, when the multi-conical cover body and the multi-conical main body fit by sealing, the diversion column is inserted into the corresponding conical tube to form a casing structure, the side of each conical tube of the multi-conical main body is provided with an air inlet, a high-speed vortex flow is formed in each conical tube to separate air with dust impurities attached, and the separated airflow is discharged upward by the diversion column, the side of each conical tube of the multi-conical main body is provided with a compensation tuyere for compensating an inlet air flow rate to reduce a negative pressure in the conical tube and improve a dust-gas separation effect, the compensation tuyere of the conical tube is smaller than the air inlet, a guide angle is provided at the air inlet, the guide angle extends away from a center of the multi-conical main body to form an enlarged inlet air collecting structure; and the air inlet of the conical tube faces a spiral direction of airflow to be entered, both the air inlet and the tuyere are at a top side of the conical tube, and the air flow rate of the inlet is greater than the air flow rate of the tuyere.

6. The dust collecting apparatus according to claim 5, wherein the air inlet of the conical tube faces a spiral direction of airflow to be entered, and the air inlet or the compensation tuyere of the conical tube is higher than a bottom port of the inserted diversion column, so that wind flows toward a bottom of a conical tube head to form a vortex flow.

7. The dust collecting apparatus according to claim 5, wherein two or more connecting columns are provided on the multi-conical cover body, the connecting columns are located in an annular ring where the diversion column is located, and each connecting column passes through a through hole fitting on the multi-conical main body and is fixed, so that the multi-conical main body and the multi-conical cover body are connected by sealing a joint surface therebetween.

8. The dust collecting apparatus according to claim 5, wherein the primary filtering structure includes a support frame, the filter screen is ring-shaped, a bottom end of the filter screen is fixed on the support frame, a top end of the filter screen and a ring portion of the diversion dome fit by connecting, the filter screen, the support frame and the diversion dome form a space for mounting the multi-conical cyclone separator, the multi-conical cover body is rotatably fastened with the dust collecting cylinder, the diversion dome includes a diversion portion and a ring portion, the diversion portion and the air inlet fit, the diversion portion has a horizontal partition surface and an arc-shaped diversion surface, and the ring portion of the diversion dome is connected to a fitting interface of the multi-conical cover body by sealing.

9. The dust collecting apparatus according to claim 8, wherein the support frame includes a support plate and a support base below, the support plate is provided with a convex column for connecting the connecting column extending downward from the multi-conical cover body, the support plate is provided with interfaces each of which matches each conical tube of the multi-conical main body, the support base has a hollow structure, the conical tube and the interface of the support plate are connected to a space inside the support base, and a bottom end of the support base is fixed at a protrusion at a center of the dust collecting cylinder.

10. The dust collecting apparatus according to claim 9, further comprising:
- a primary filtering flow path which is used to filter larger dust impurities, formed in a space between the dust collecting cylinder and the primary filtering structure, and connected to the air inlet, a first collecting portion, and several meshes of the filter screen;
- a secondary filtering flow path which is used to filter smaller dust impurities, composed of a plurality of cyclone flow paths arranged in parallel, formed in a space inside the multi-conical cyclone separator, each cyclone flow path being connected to the air inlet of the conical tube, a space inside the conical tube, a second collecting portion, and an air outlet of the multi-conical cover body; and
- a connecting flow path which connects the meshes of the filter screen of the primary filtering structure and each air inlet of the multi-conical cyclone separator, so that airflow filtered by the primary filtering structure is distributed to the multi-conical cyclone separator.

* * * * *